(12) United States Patent
Henson et al.

(10) Patent No.: US 7,791,608 B2
(45) Date of Patent: Sep. 7, 2010

(54) SYSTEM AND METHOD OF ANIMATING A CHARACTER THROUGH A SINGLE PERSON PERFORMANCE

(75) Inventors: Brian Henson, Hollywood, CA (US); Jeff Forbes, Valencia, CA (US); Michael Babcock, Los Angeles, CA (US); Glenn Muravsky, Studio City, CA (US); John Criswell, Tujunga, CA (US)

(73) Assignee: The Jim Henson Company, Inc., Hollywood, CA (US)

( * ) Notice: Subject to any disclaimer, the term of this patent is extended or adjusted under 35 U.S.C. 154(b) by 415 days.

(21) Appl. No.: 11/777,975

(22) Filed: Jul. 13, 2007

(65) Prior Publication Data

US 2008/0012865 A1    Jan. 17, 2008

Related U.S. Application Data

(60) Provisional application No. 60/807,496, filed on Jul. 16, 2006.

(51) Int. Cl.
*G06T 15/70*    (2006.01)
(52) U.S. Cl. ...................... 345/474; 345/473
(58) Field of Classification Search ........................ None
See application file for complete search history.

(56) References Cited

U.S. PATENT DOCUMENTS 6,377,281 B1    4/2002    Rosenbluth et al.
6,552,729 B1*   4/2003    Di Bernardo et al. ........ 345/473
6,758,678 B2*   7/2004    Van Gilder et al. ........... 434/365
6,870,574 B2*   3/2005    Kriegman .................... 348/587
7,068,277 B2*   6/2006    Menache ..................... 345/473
2003/0146914 A1*  8/2003    Sholev ........................ 345/419
2006/0106494 A1*  5/2006    Alvarez et al. .............. 700/251

OTHER PUBLICATIONS

Yamane, Y., Hodgins, J., Brown, H. B., Controlling a Marionette with Human Motion Capture Data, Jun. 2004, International Journal of Humanoid Robotics, pp. 1-17.*
Scott, R., Sparking Life Notes on the Performance Capture Sessions for The Lord of the Rings: The Two Towers, Nov. 2003, ACM SIGGRAPH vol. 37 No. 4, pp. 17-21.*

* cited by examiner

*Primary Examiner*—Peter-Anthony Pappas
*Assistant Examiner*—Said Broome
(74) *Attorney, Agent, or Firm*—Davis Wright Tremaine LLP; George C. Rondeau, Jr.; Heather M. Colburn

(57) ABSTRACT

A method of animating a computer generated character in real-time through a single person performance is disclosed. The method provides a mobile input device configured to receive a hand puppetry movement as an input from a performer. Further, the method provides a motion capture device that includes a plurality of markers. The motion capture device is configured to be worn on the body of the performer. Motion capture data is received at a computer. The motion capture data is representative of the positions of the plurality of markers. In addition, input device data is received from the mobile input device at the computer. A computer generated animated character is then generated, the body movements of the character being based on the motion capture data, and head and facial movements being based on the input device data received from the mobile input device.

24 Claims, 8 Drawing Sheets

SYSTEM AND METHOD OF ANIMATING A CHARACTER THROUGH A SINGLE PERSON PERFORMANCE

RELATED APPLICATIONS

This Application claims priority to U.S. Provisional Patent Application No. 60/807,496, entitled "SYSTEM AND METHOD OF ANIMATING A CHARACTER THROUGH A SINGLE PERSON PERFORMANCE," filed on Jul. 16, 2006, the contents of which are incorporated herein by reference in its entirety.

BACKGROUND

1. Field

The present disclosure relates to a system and method for animating a computer generated character in real time through a single person performance.

2. General Background

Creating computer animated performances for use in television and movies can be an extremely time consuming process. In a current approach for animating a computer generated character, motion capture is used to record a performer's movements. Further, the character's body is animated based on the recorded movements. The performer typically wears a motion capture suit having a plurality of markers, each of which are usually located near a joint to identify the motion by the positions or angles between the markers. The markers, which may be acoustic, inertial, light emitting diode ("LED"), magnetic or reflective markers, or combinations of any of these, are tracked by sensors and/or cameras. Computer software translates the positions, angles, velocities, accelerations of the markers, thereby providing an accurate digital representation of the motion of the performer.

In entertainment applications, motion capture can reduce the costs of animation which otherwise requires the animator to draw each frame or with sophisticated software that interpolates key frames. While motion capture saves time and creates more natural movements than manual animation, it is limited to motions that are anatomically feasible. Furthermore, certain movements such as facial expressions can be difficult to capture using conventional motion capture systems. Therefore, motion capture cannot be used alone to animate an entire character.

U.S. Pat. No. 6,377,281 describes a method and apparatus for creating computer graphical character performances and is hereby incorporated by reference in its entirety. In the method and apparatus disclosed in U.S. Pat. No. 6,377,281, performer movement information is received at a computer from a manual input device that receives live manual manipulations from a performer. Generally, the manual input device includes a plurality of position transducers, such as analog position transducer potentiometers mounted in a mechanical assembly that simulate the motions used by a puppeteer to manipulate a conventional puppet. The mechanical elements or physical controls are directly manipulated by a performer, and the electromechanical transducers convert mechanical motion of the mechanical elements into proportional electrical signals.

For example, the hands of a performer are received in left-hand and right-hand mechanical assemblies that include levers, rotatable shafts, tiltable plates, and related equipment. The mechanical assemblies may include a gyro waldo, stick, arm waldo, etc. The mechanical assemblies can be manually manipulated through a range of positions that are homologous to the positions through which the hands of a performer move when manipulating a conventional hand puppet, electromechanically actuated puppet or other artificial creature. For example, the mechanical input device may include one or more joysticks, data gloves, pushbuttons, or other elements to receive mechanical movement and generate electrical signals.

Animation of a typical character performance usually requires a team of people to coordinate the performance. Generally, a first performer (called a "puppeteer") provides input movements to such mechanical input devices to control facial expression and head movements. Further, the first performer can provide voice for a character. A second performer provides body movements for the character through a motion capture system. The two performers have to work together to coordinate movements. The movements are used collectively to create a single animated character.

The equipment used in generating the facial expressions can be quite bulky and tends to be stationary. Therefore, at least two performers are required to generate a computer animated character performance.

SUMMARY

In one aspect of the disclosure, a method of animating a computer generated character in real-time through a single person performance is disclosed. The method provides a mobile input device configured to receive a hand puppetry movement as an input from a performer. Further, the method provides a motion capture apparatus that includes a plurality of markers. The motion capture apparatus is configured to be worn on the body of the performer. Motion capture data is received at a computer. The motion capture data is representative of the positions of the plurality of markers. In addition, input device data is received from the mobile input device at the computer. A computer generated animated character is then generated, the body movements of the character being based on the motion capture data, and head and facial movements being based on the input device data received from the mobile input device.

In another aspect, a device for animating for a computer generated character through a single person performance is disclosed. In one aspect, the device comprises a head-hand controller and a hand-hand controller. The head-hand controller is configured to be operated by a first hand of a single performer, and is located in a head portion of the device. The head-hand controller is configured to control facial movements of the computer generated character. The hand-hand controller is configured to be operated by a second hand of the single performer, and is located in an arm portion of the device. The hand-hand controller is configured to control hand movements of the computer generated character. The device further comprises a plurality of markers configured so that a motion capture system records movements of at least a portion of the body of the computer generated character, the plurality of markers being located on a body portion of the device.

In yet another aspect, a method of animating a computer generated character in real-time through a single person performance is disclosed. Further, the method provides a first mobile input device configured to receive a first input from a performer, the first input being a first hand puppetry movement. In addition, the method provides a second mobile input device, distinct from the first mobile input device, configured to receive a second input from a performer. The second input is a second hand puppetry movement distinct from the first hand puppetry movement. The method also provides a motion capture apparatus that includes a plurality of markers. The motion capture apparatus is configured to be worn on the body of the performer. Further, the method receives motion capture data at a computer. The motion capture data is representative of the positions of the plurality of markers. In addition, the method receives a first set of input device data from the first mobile input device at the computer. The method also receives a second set of input device data from the second mobile input device at the computer. The method renders a computer generated animated character in which a body movement is based on the motion capture data, a head and a facial movement are based on the first set of input device data, and a hand movement is based on the second set of input device data.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

A system and method of animating a computer generated character in real time by way of a single performer is disclosed. A description of the process involved in animating a computer generated character performance is now provided with reference to FIGS. 1-3. The animation process can be divided into three main areas: pre-production, stage production, and post-production.

Figure 1:
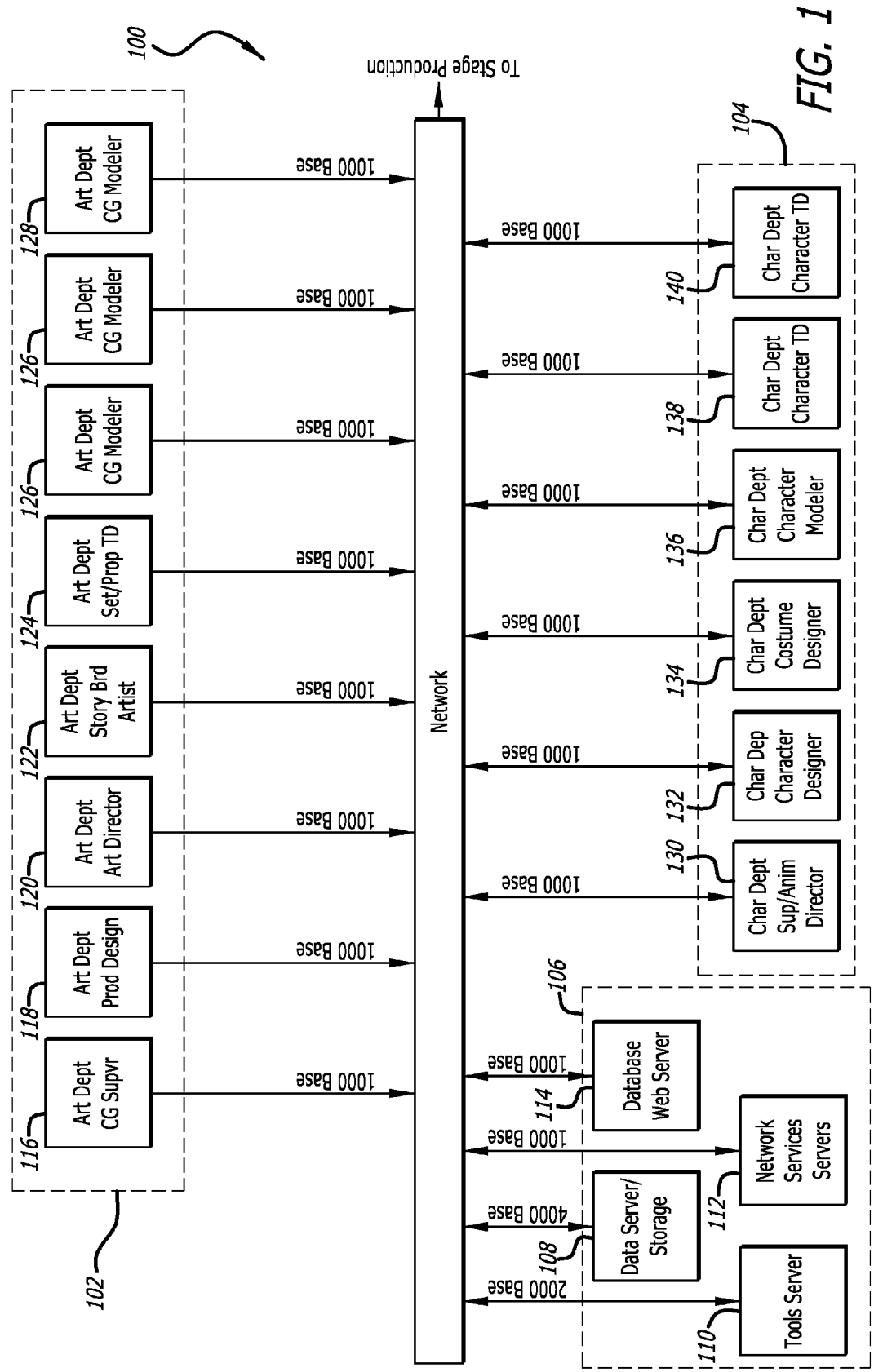
FIG. 1 is a block diagram illustrating a pipeline of the pre-production portion of the animation process.

FIG. 1 is a block diagram illustrating a pipeline 100 of the pre-production portion of the animation process. Pre-production involves the creation of the digital assets for a production, e.g., a television show or movie. Examples of assets are computer generated ("CG") characters, CG models, CG props, and CG sets etc. In one embodiment, the assets are created in a CG/3D modeling software package. A group of individuals, under the direction of various supervisors, builds the models, characters, props and sets. The assets are typically stored in a large data server. The pre-production process generally involves departments such as an art department 102 and a character department 104. The art department 102 and the character department 104 can be physically located almost anywhere as long as they have access to the main production network.

In one aspect, data related to the production is stored in a data server storage system that may be physically located in a corporate server room location. The data server storage system can include a plurality of remote file servers for data storage. For example, the server room 106 has a data server/storage 108 that can store data. In one embodiment, the data server/storage 108 can store several terabytes of data. All of the assets are stored on the data server/storage 108 for storage. The assets are accessed through the data server/storage 108 through all three portions of the pipeline: pre-production, post-production, and the stage production. Further, the corporate server room 106 can have a tools server 110, which is a server that has custom tools and plug-ins for a variety of different applications to help expedite both the pre-production and the post-production processes. In addition, the corporate server room 106 has a plurality of network servers 112 to perform general networking, monitoring and controlling functions. The corporate server room 106 can also include a custom database 114. The custom database 114 allows tracking, versioning and task assignments throughout the whole production pipeline. For example, the database tracks tasks and related assignment information such as to whom the task was assigned, and who assigned the task. An approval process is utilized so that once a task has been completed, the task is marked as completed, and approval is requested. If approval is obtained, the completed task is provided to the next person in a responsibility chain. If approval is not obtained, the task is provided, with notes, back to the person assigned to do the task.

The art department 102 and the character department 104 utilize the database 114 to tracks all work performed within the departments. The art department 102 includes a group of artists responsible for creating the look of the set and props used in the various scenes of a show. In one embodiment, the art department 102 of an episodic television show may have approximately six to ten people. An art department CG Supervisor 116 oversees the various artists within the art department, which includes but is not limited to a production designer 118, a director 120, a story board artist 122, a set/prop technical director 124, a CG modeler 126, and a texture painter 128. Further, there may be more than just one of these people in the art department 102. For example, as illustrated in FIG. 1, there may be a plurality of CG Modelers 126 within the art department 102.

The art department production designer 118 usually works with the look of a scene, including sets, rooms, etc. The art department production designer 118 can work closely with the art department art director 120, who designs elements of the set according to the direction of the art department production designer 118. The art department set/prop technical director 124 oversees the setup and rigging of props, i.e., how the props may be attached to the characters or how the rigs are working rig-wise if rigs are to be motion captured. Motion capture props can be utilized within this concept of performing on the stage. Further, the art department CG modeler 126 is responsible for physically creating what the art director 120 and production designer 118 are visualizing. The art department's production designer 118 and art director 120 may be working in a 2-D environment, and it is the responsibility of the CG Modeler 126 to bring that 2-D vision into a 3-D realm. There may be more than one CG Modeler 126 sharing the workload. For instance, the CG supervisor 116, production designer 118, and art director 120 may assign a cast to two CG modelers 126. In addition, the art department texture painter 128 takes the 3-D models and, based upon the visuals the art director 120 is looking for, creates different textures. For example, the texture painter 128 can create a wallpaper texture look, a stucco ceiling look, a wood look painted upon what looks like a log home or a wooden floor. The art department story board artist 122 works in conjunction with the producers and directors. The storyboard is created at the end of a script so the producers and directors have a good idea visually of what they plan to capture through the lens when they get to the stage production portion of the animation process.

While the art department 102 is dealing with sets and props, the character department 104, by definition, is dealing with just the characters. A character department supervisor/animation director 130 looks at how the characters are created and how the characters are supposed to move. A character designer 132 and a costume designer 134 work on creating the design of the character as well as the costume design for the character. In addition, a character department CG modeler 136 transforms the vision of the character designer 132 and costume designer 134 from a 2-D perspective into a 3-D perspective. In one aspect, a 3-D sculpture is made from the 2-D flat work. The 3-D sculpture can be laser-scanned to generate a cloud of data points that can be utilized to generate a mesh for a character. The character modeler 136 can utilize the mesh to start modeling. A character department technical director 138 can then utilize the 3-D model of the character to rig and generate a mesh for a character. The character department technical director 138 also implements intended expressions for the character. As a result, a fully rigged and performable character is created. For example, the lips of a character can be made performable such that they perform lip-syncing to a person's voice. The fully rigged character can now be utilized within the rest of the pipeline infrastructure, including the stage and the post-production processes. Of course, there may be more than one person of the same or similar positions in the character department 104. For instance, as illustrated in FIG. 1, there may be two technical directors 138 and 140 within the character department.

Figures 1, 2:
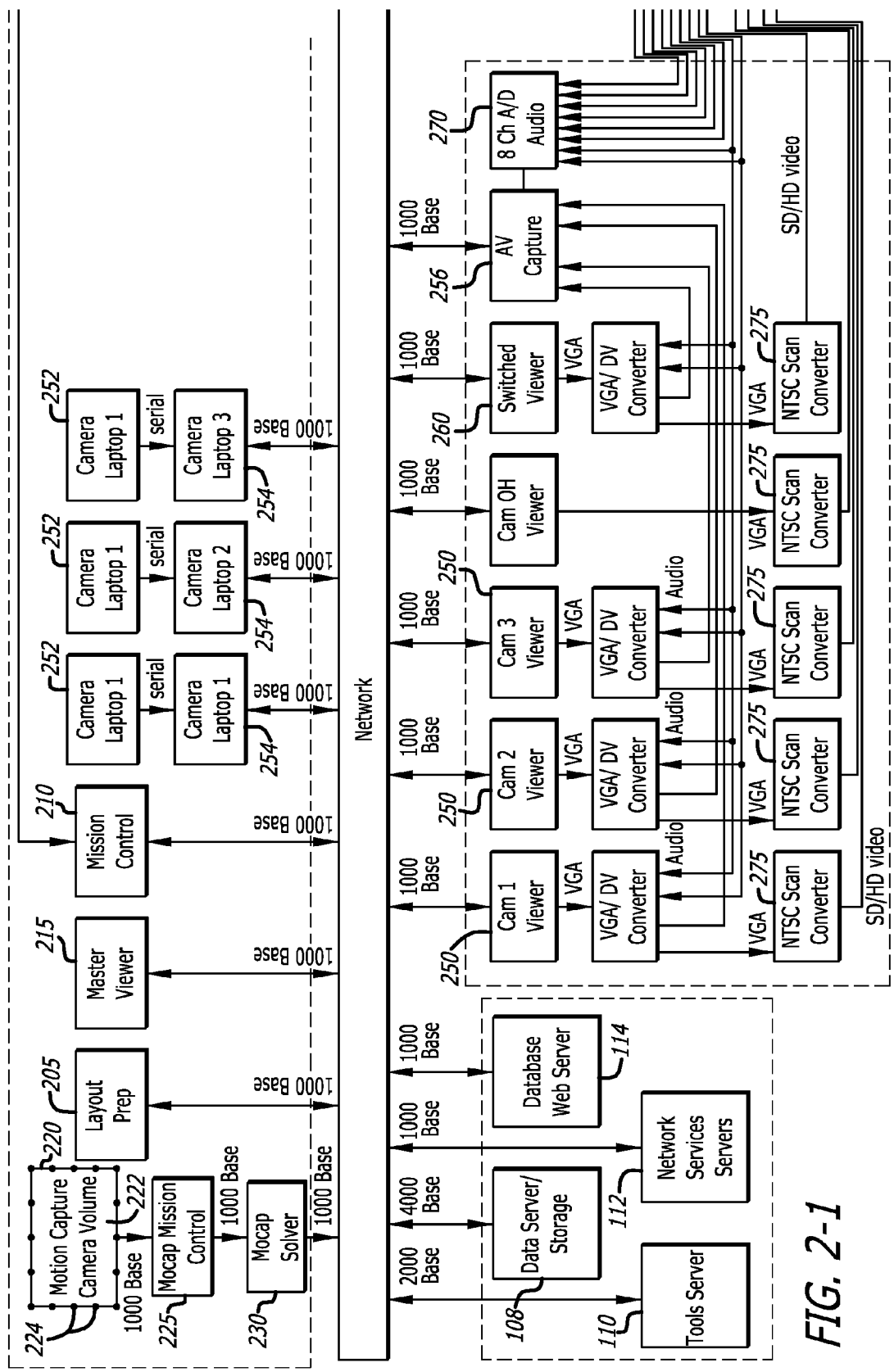
FIG. 2 is a block diagram illustrating the stage-production portion of the animation process.
Figure 2:
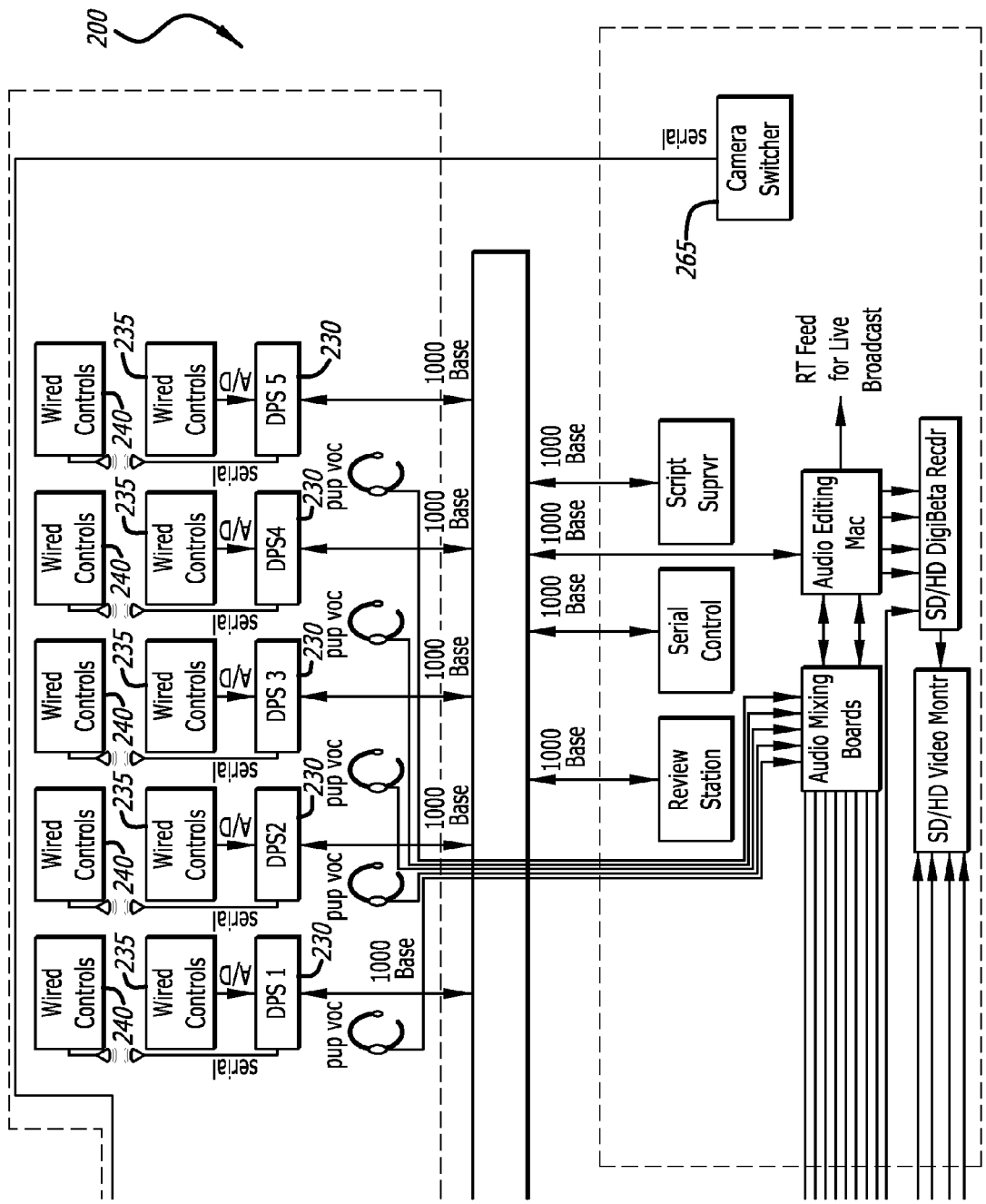

FIG. 2 is a block diagram illustrating an exemplary embodiment of the stage-production portion 200 of the animation process. The stage production portion of the process is where performers create or perform the movements used to animate the CG characters.

Most of the stage production process physically occurs at a soundstage production floor location 202. Before the character performance begins, the assets and layout required for the CG scene or set are retrieved. The layout prep computer 205 is where assets required for a scene, such as CG background sets, props, and character information are retrieved from the data server 108 where they were stored during pre-production. Based upon what is required for a scene, a person calls up sets, props and characters based upon what that shooting day's requirement is. For example, a bedroom set or scene might involve retrieving assets such as bedroom furniture. Next, specific character assets are retrieved. For example, characters A and B are being used. This can be accomplished through working in a CG software package such as Autodesk® Maya®. When the scene is assembled, the scene is passed on to mission control 210, where it is viewed through the master viewer 215. In such an environment, the computers and operators can still manipulate and make changes within the set down to the last moment before character performance and recording begins, based upon the producer or director's final input.

Once all the assets required for a scene have been retrieved and properly laid out using the layout prep computer 205, the character performance is ready to be introduced. As discussed earlier in the Background, animation of a typical character performance often requires a team of people to coordinate the performance. Character performance generally consists of one or more performers performing various movements, the movements being used to animate a CG character. For instance, a single performer operating within a motion capture stage provides movement data for a portion of one character, while a second performer provides movement data for another portion of the character through methods other than motion capture. For example, a first performer wears a motion capture suit and moves around the motion capture stage to provide overall body movements for the character. However, a second performer, usually outside of the motion capture stage, operates hand controls to provide movement data for the head, facial expressions, and hands of the character. In other words, the animation of a single CG character actually requires at least two performers: one person responsible for the body of the CG character and another person responsible for the head and facial movements, as well as the voice of the CG character.

However, the single performer system and method disclosed herein allows for a single performer to animate an entire CG character. As a result, there is more spontaneity for animating the CG character. Furthermore, the traditional form of puppeteering can realistically be utilized in the digital realm. In other words, two brains cannot be as spontaneous as one brain for a CG character. Further, the single system and method allows production costs to be reduced because only one performer has to be paid as opposed to two or more performers.

The soundstage floor 202 includes a motion capture system 220 which consists of a floor area, or motion capture stage 222 surrounded by a plurality of cameras 224 which track the position of markers located within the floor area 222. In one embodiment, the motion capture stage 222 is a volume of forty ft.×forty ft. and utilizes 28 digital cameras 224. Although motion capture usually runs through software specific to a particular a motion capture company, it should be noted that the motion capture system 220 is not limited to any particular hardware, software, manufacturer or set of equipment. The motion capture system 220 is a simply a module that can be plugged into the overall animation process. Motion capture data based on the performer movement information is streamed to the master viewer 215 and is recorded by the motion capture mission control device 225. The motion capture data is then transmitted to a motion capture solver 230. The motion capture solver 230 is software and/or hardware dedicated to solving the skeleton of the motion capture performer, and whatever props may be within the motion capture volume, in as close to real time as possible. The solver addresses a common problem faced by animators of scaling and retargeting motion-capture data to adjust different proportions between the performer and the computer-generated character. The motion capture solver 230 applies motion-capture data to a fixed bone-length skeleton, compensating for local motion-capture marker movements and mathematically "solving" for the difference in the actor's and CG character's proportions. That solved skeleton is then streamed over the network into mission control 210, where it is then plied onto the skeletons of the CG characters to be animated as represented by the performers.

The motion capture area is primarily for the motion capture artists or performers, who are responsible through their motion capture suits and markers for creating body movement of the character. A motion capture performer provides body movements through walking around and interacting with the set. However, in accordance with the present disclosure, the performer also simultaneously utilizes a single performer apparatus through which puppetry movements are provided, thereby creating facial movements, expressive lip-synching, finger movements, and voice to a character. Therefore, a single performer simultaneously provides both motion capture data for animating the body of the character and puppetry data for animating the face and hands of the character, such that all the animated movements for a CG character are performed at once, and by a single performer. The single performer apparatus is discussed in further detail with reference to FIGS. 4-7.

Digital Performance Systems 230 (DPS 1 through 5 shown in FIG. 2) receive puppetry data from the performer to create the facial animation, lip synch, and audio vocalizing of the characters that they represent. A digital performance system includes hardware and software which allows a puppeteer to control the many movements of an animatronic or computer generated character. A manual input device receives live manual manipulations that are homologous to a puppetry performance from a hand of a performer. The manual/mechanical manipulations are then converted into a digital signal and used by the digital performance system to create a facial animation. The manual input devices may for example include one or more analog position transducer potentiometers mounted in a mechanical assembly that simulates the motions used by a puppeteer to manipulate a conventional puppet.

The performer movement data, regardless of whether it is motion capture data, or other input device data, is used to animate a CG character. Therefore, using such data, the animated CG character is rendered along with the set/scene as laid out earlier. This rendering of the animated CG scene is done in substantially real-time, and is displayed on the master viewer 215. The performers are thereby able to watch the animated CG character result of their performance in real time with their performance. This allows the performer to make adjustments to his or her performance in real time, and results in a more realistic or interesting character result.

A plurality of different views 250 of a scene can be created using software. Each view of a scene that is created runs within mission control and is streamed out to individual computers that are running a variety of viewers 250. In one embodiment, there are three viewers 250—camera one viewer, camera two viewer, and camera three viewer. Each viewer 250 displays a different view or perspective of the scene. For example, camera one's viewer may show a close up view of the character. Camera two's viewer could show a wide angle view of the scene from one angle, and camera three's viewer could show another angle. Therefore, the viewers mimic what could be seen by three separately controlled cameras at different camera angles. A camera controller 252 is further associated with each viewer. The camera controllers 252 are custom-built serial devices that mimic a jib arm control, so that a static camera operator from the real world television industry can come in and work in the CG industry without any re-training. Once again, we are utilizing the disciplines that already exist in those individuals.

The camera controllers 252 plug into camera laptops 254 that run the performance control system, which is a software interface that allows operators, performers to fine-tune their controls so that the sensitivity and the range of motion that they use can be set for those individuals. The performance control system document, or character document, streams into mission control 210 as a performance data stream. Through their camera controllers 252, these cameras are always live and flyable through the 3-D environment and beyond if needed. The cameras and camera controllers 252 are each manned by an operator who is visually in control of their camera view on the monitor in front of them.

All the data streams, from motion capture 222 and from digital performance systems 230, are streamed to mission control 210 where they are recorded and synchronized. Mission control 210 also controls starting and stopping of motion capture so that information recorded through the motion capture system, has the same frame ranges as the rest of the systems. Therefore, mission control 210 aids in synchronizing data so that it can come together and for post-production. Mission control 210 also ensures that the same number of frames is present across data types. Furthermore, mission control 210 starts and stops the audio-visual (AV) capture systems 256.

In one embodiment, the audio system includes an eight channel analog to digital (A to D) system, for recording eight separate audio tracks 270 and that are fed from the audio department. Track one generally contains production information such as audio from the director, floor manager, script supervisors, etc. Track one may also contain any information regarding timing issues, and might have reference music on it. Track two is generally a mono mix of all the character voices. Tracks three through eight are all audio tracks of individual character voices that are used later in the post-production process.

There is a switch camera operator in a control booth that uses a camera switcher 265 to switch between the multiple camera views on the fly. Accordingly, a real time switch or edit is created on the fly based upon rehearsals and blocking from an earlier time. As the switching occurs, a dedicated view showing of that switch on the fly is displayed through the switched viewer 260. The switched viewer 260 is generally what most people on the floor, including the director are looking at, since it is essentially a rough edit of the animated production.

The camera switcher device 265 is also plugged into mission control via serial cable. Anytime the camera switcher device 265 is used to switch from one camera to another, those switches are noted by mission control, and mission control creates a file of what switch was effected at what time for what camera. This information is also part of the recorded data and is useful in post-process. In post-process, the edit is recreated utilizing the isolated camera feeds instead of the switch feed. As a result, almost everything that is manipulated on the stage is actually recorded to be used in the post process for animating.

The isolated footage from each of the camera viewers 250, for example camera one camera two, camera three, as well as the switch camera view 260 are all recorded simultaneously. This results in four digital video ("DV") streams. The system records DV footage with audio that is used as a playback system for referencing purposes. Audio channels one and two are converted to a digital signal and, along with the four digital video streams, can be used for playback and review. For example, if a director wants to see a previous take, which was shot five minutes ago, the DV footage along with audio and video for reference, can be distributed onto the floor for any areas to be reviewed and played back. The system may also record eight channels of high resolution audio, i.e., twenty four bit at ninety six kHz resolution and eight tracks. This recording is the final audio that is utilized for production.

Figures 1, 3:
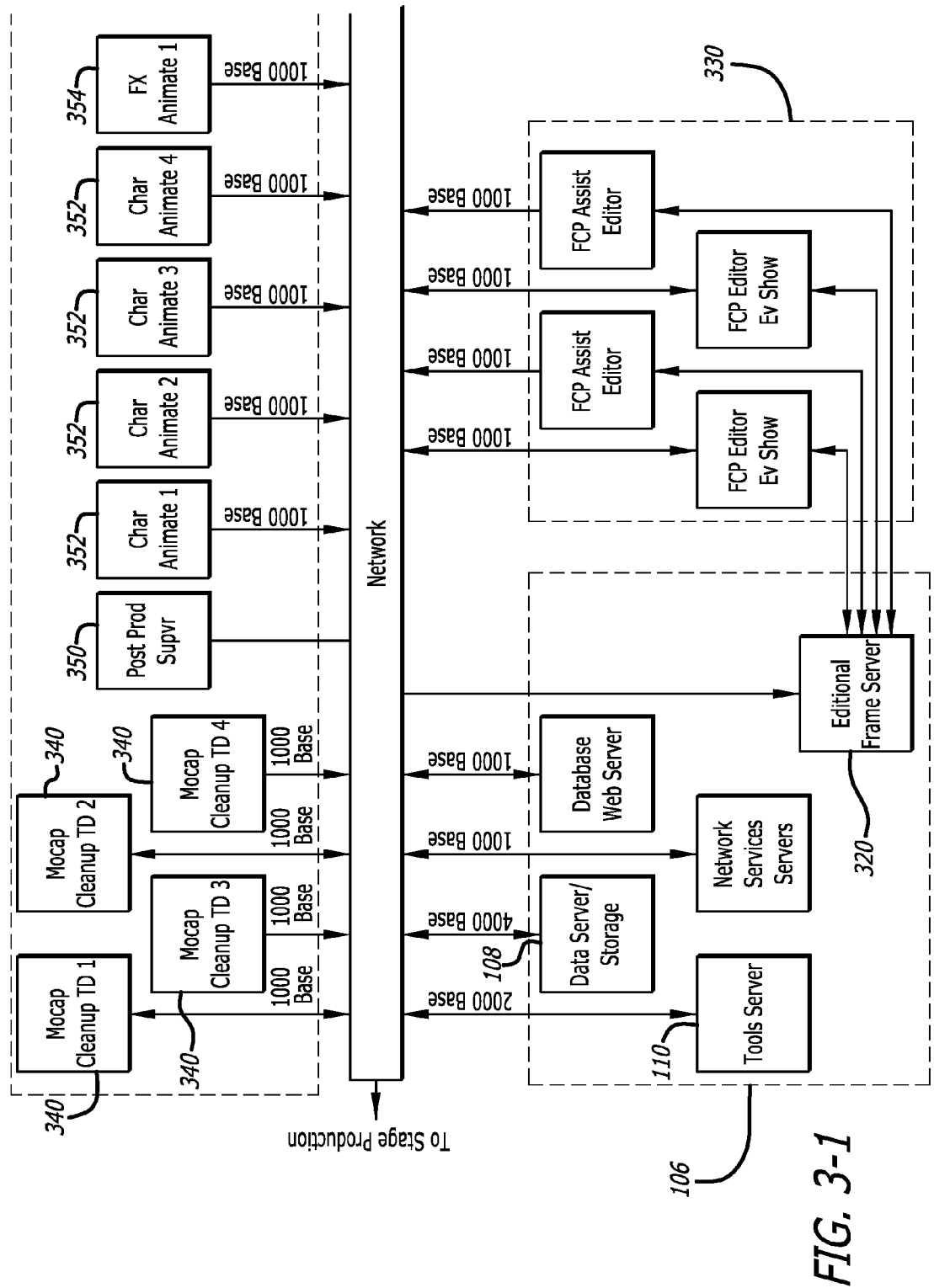
FIG. 3 is a block diagram illustrating a pipeline of the post-production portion of the animation process.
Figures 2, 3:
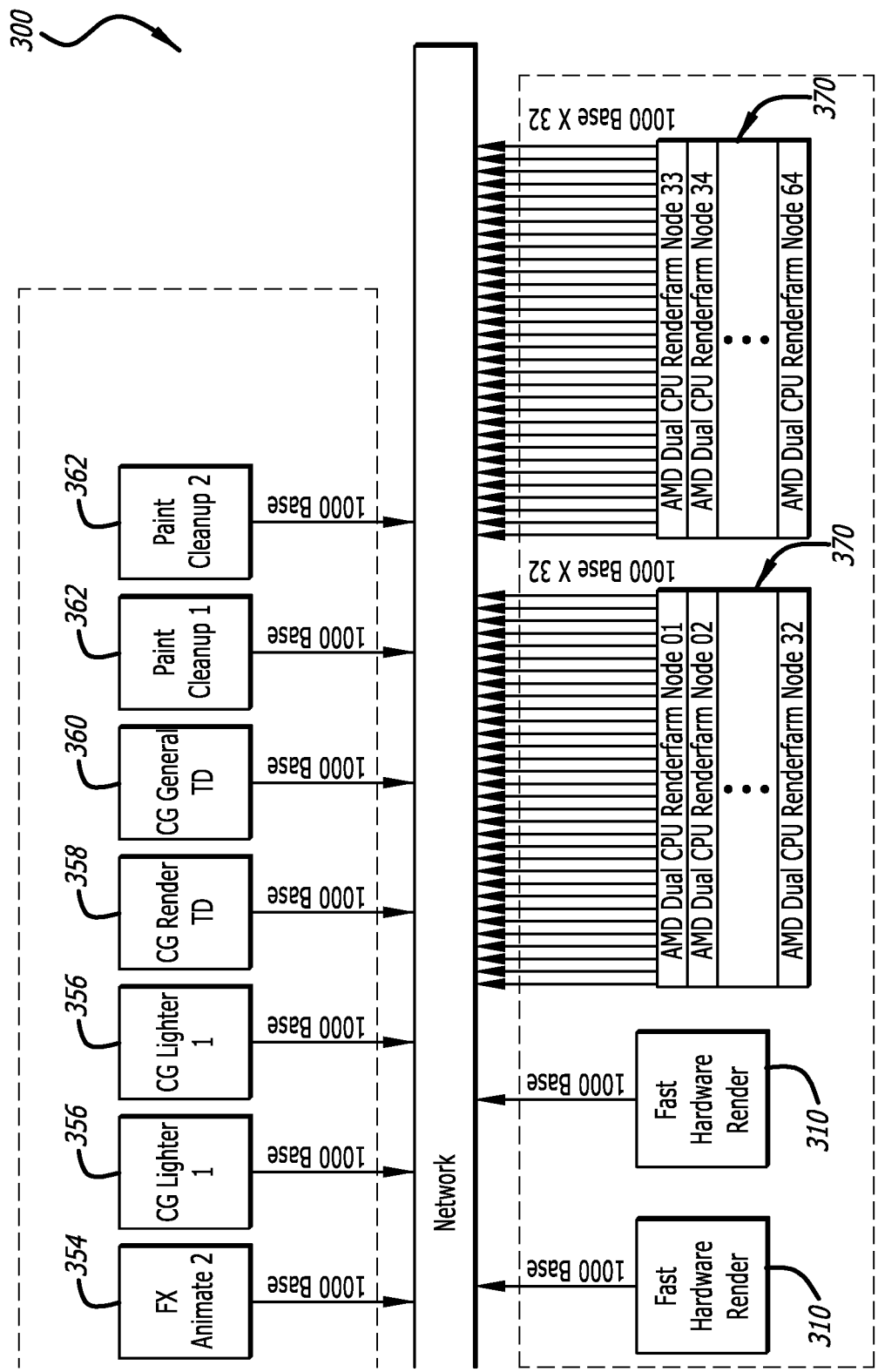

FIG. 3 is a block diagram illustrating an exemplary pipeline 300 of the post-production portion of the animation process. Post-production is the general term for all stages of production happening between the actual recording and the completed television show, film or video. Post-production typically includes cleanup and editing of the audio and video. The post-production phase of creating a film can often take longer than the actual shooting of the film, and can take several months to complete.

As mentioned previously, a rough edit of the show is taken during the stage production process. This is the switched camera view 260. This switched camera view is generally only used for reviewing purposes. During the post-production process, this switched view of a selected take is recreated using higher quality data. Therefore, all of the frames from each of the different camera views that make up the switched view need to be recreated, or re-rendered. The resulting rendered frames are then deposited into an editorial frame server 320. Several editors at editorial bays 330 use editing software such as Apple Computer Inc.'s Final Cut™ Pro ("FCP") to recreate the actual edit so that it matches exactly the one that was seen on stage in real time.

Once the edit is complete for an episode, an edit decision list ("EDL") is created, which identifies what frames were used from what takes. The EDL is stored to the data storage server 108 and posted so that the motion capture team 340 has an opportunity to start cleaning up information. It should be noted that up until this point the data is un-cleaned raw data as was recorded on stage. There may likely be glitches, twists or pops visible in this fast render and this first EDL coming out of the editorial division 330.

Once the range of frames to be used has been determined, that information is passed to motion capture 340, where the motion capture data is cleaned up. In some embodiments, the motion capture data is the character's body data. Clean-up only occurs for frame ranges on takes that are visible within edit. There is no clean up performed on frames that are not going to be seen. Once the data is cleaned up, the data is mapped back onto the CG character's meshes and a Maya scene is created that is then passed into the post-production department.

At that point, the head, facial and finger data, along with the audio, is introduced in conjunction with the cleaned-up motion capture data, and several character animators 352 work to start assembling the final scenes of the animation. This is all under the supervision of the post-production supervisor 350. There are also effects animators 354 that work on other things (not necessarily related to character cleanup) such as dropped props within the scene. At this point, the scene should start coming together from an animation perspective, e.g., characters are not passing through props and sets, and characters are interacting properly with each other. For example, characters' hands are not going through the other characters' bodies.

The results of this clean-up are then passed on to the lighters 356 and texturing people who start adding on the final lighting and texturing and effects work, in preparation for the final render. Rendering technical directors 358 start setting up the rendered layers that are going to be utilized to create the final product, whether it be standard definition, high definition, or even analog and National Television Standards Committee ("NTSC") format, in the case of episodic television. This whole team is essentially getting ready for the final look in the final render.

The finalized data is then sent to a large render farm 370, which in one embodiment is made up of sixty four individual computers, each having dual processors. The render farm's sole purpose is to take in the individual frames and render them up to the level required based upon the lighting and texturing and the animation the post-production team managed and provided. The high resolution frames are then used to replace the fast render frames within editorial. The eight-track audio from the stage is used to create a final cut, such that character voices can be processed individually, and balances adjusted, if required.

Figure 4:
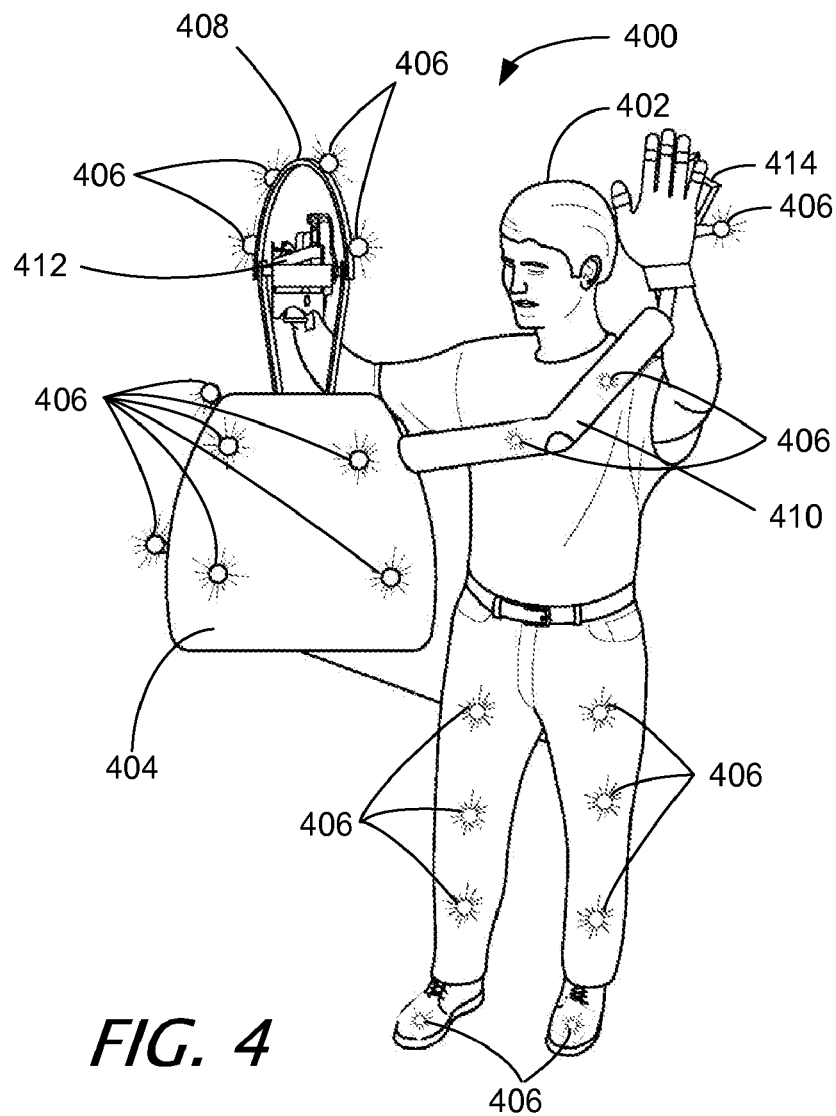
FIG. 4 is a schematic illustrating one embodiment of a single person performer with a single performance apparatus.

FIG. 4 illustrates an exemplary illustration of a single performer apparatus 400 which may be utilized by a single performer 402 to animate a CG character. In one embodiment, the single performer apparatus 400 comprises a puppet-like device 404. The puppet-like device 404 is held or carried by the performer 402 similarly to how an ordinary puppet would be held, and the performer uses his or her hands to control the facial expressions and/or body movements of the character. With this implementation, a performer that is used to utilizing a traditional puppet can perform similar movements and still animate a CG character. The device 404 comprises a plurality of markers 406 for use with a motion capture system. Furthermore, a plurality of markers 406 can be positioned on the performer 402. For example, the performer may wear a conventional motion capture suit, which may be a tightly fitting garment having a plurality of markers attached. In one aspect, the plurality of markers may be positioned on only selective portions of the performer's body. For instance, the plurality of markers can be positioned on the legs of the performer 402 such that the performer's leg movements provide the leg movement of the CG character while markers located on the device 404 are used to animate the upper portion of the body of the CG character. Accordingly, as the performer 402 moves his or her legs, the legs of the CG character can be animated. As the performer 402 moves the puppet-like device 404, the motion capture system records the positions of the plurality of markers 406 on the device 404. The motion capture system can then provide the positions of the device 404 as well as the performer 402, in real-time to a computer, which can interpret the position data and animate the CG character based on the position data.

In one embodiment, the device 404 comprises a head portion 408 and an arm portion 410. In one embodiment, an arm portion 410 of the device is coupled to an arm of the puppeteer 402. The puppeteer can therefore move the arm portion 410 of the device 404 with his or her own arm movements. The arm portion 410 also has a plurality of markers positioned thereon such that the motion capture system can record the position of the arm 410 and provide the position to the computer, which can interpret the position data of the arm 410 and animate the arm portion of the CG character based on the position data of the arm portion 410 of the device 404.

In one embodiment, the device 404 comprises only one arm 410, and the movement of the arm 410 by the puppeteer 402 provides the motion for two or more arms of the CG character. For example, if the character being animated has two arms, the movement of one arm 410 by the performer can be mirrored or duplicated to produce movement of two arms. For instance, the puppeteer 402 can move the left arm 410 of the device 404, and the resultant character motion is a left and a right arm moving in a mirrored manner. Expression algorithms may be provided to determine the movement of the other arm, such that the movement is not an exact mirror image, and thereby looks more realistic.

In addition to a plurality of markers used for motion capture, the single performer apparatus 400 comprises at least one manual input device for receiving live manual manipulations that are homologous to a puppetry performance from a hand of a performer. The single performer apparatus 400 allows the puppeteer 402 to perform in a manner that the puppeteer 402 is familiar with, i.e., by holding the device 404 at approximately shoulder level. In one aspect, a manual input device is provided for each the left and right hands of the performer.

In one embodiment, a manual input device in the form of a head-hand controller 412 can be positioned within the head portion 408 of the device 404. The head-hand controller 412 allows the puppeteer to control the head, face, and/or lip motions of the CG character. The head-hand controller 412 can receive inputs by pressing buttons, moving the hand and/or fingers in a particular motion, etc. Further, the head-hand controller 412 is a serial device that receives and/or transmits wireless transmissions. In another embodiment, the head-hand controller has a band across it with at least one marker 406 so that the motion of the head is recorded by the motion capture system as opposed to the puppeteer 402 performing an action, e.g., pressing a button, to move the head of the CG character. For instance, the puppeteer 402 can perform the following head movements on the CG character through motion capture: left, right, up, down, tilt and twist. The puppeteer 402 can still perform an action to make a facial expression or cause a motion of the lips.

Further, the puppeteer 402 can utilize a hand-hand controller 414 positioned at the end of the arm of the device 404 to control the hand and finger movements of the animated CG character. The hand-hand controller 414 can receive inputs by pressing buttons, moving the hand and/or fingers in a particular motion, etc.

The head-hand controller 414 and hand-hand controller 414 also allow the performer to hold or carry the puppet-like device 404, and move the device 404 around as a whole. The performer 402 can further be provided with an audio microphone such that the vocal portion of the performance of the puppeteer 402 can be recorded. In one embodiment, the audio microphone is wireless to facilitate movement of the performer 402. As a result, a complete CG character performance can be derived from one puppeteer 402.

Figure 5:
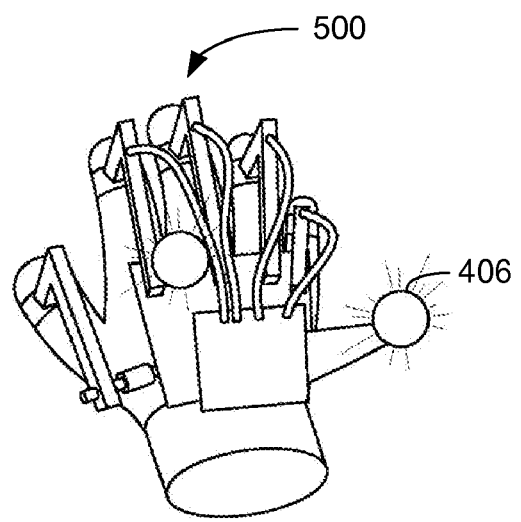
FIG. 5 illustrates a magnified view of a controller for use in a single performer apparatus.

FIG. 5 illustrates a magnified view of a manual input device, or controller 500. The controller 500 can be utilized for the head-hand controller 412, the hand-hand controller 414, or both. The controller 500 may include one or more analog position transducer potentiometers mounted in a mechanical assembly that simulates the motions used by a puppeteer to manipulate a conventional puppet. Input devices may include sticks, waldos, footswitches, and other mechanical elements or physical controls that are directly manipulated by a performer, and the electromechanical transducers that convert mechanical motion of the mechanical elements into proportional electrical signals.

For example, the hands of a performer are received in left-hand and right-hand mechanical assemblies that include levers, rotatable shafts, tiltable plates, and related equipment. The mechanical assemblies may include a gyro waldo, stick, arm waldo, etc. The mechanical assemblies can be manually manipulated through a range of positions that are homologous to the positions through which the hands of a performer move when manipulating a conventional hand puppet, electromechanically actuated puppet or other artificial creature.

In one embodiment, a stick is used to control motor functions of body parts of the creature, and a waldo is used to control opening and closing the mouth and to control other facial features of the creature. A stick typically has a left/right movement transducer, a forward/back movement transducer, a twist transducer, and one or more finger transducers associated with upward or downward movement of a performer's fingers. The stick may also have a thumb control that is often used to perform eye movements. A waldo may have a thumb transducer, jaw transducer, palate transducer, up/down movement transducer, left/right movement transducer, and twist transducer. Shoulder, elbow, wrist, and other movements may be accommodated and associated with transducers.

Alternatively, other devices may be used to convert performance movements into electrical signals. For example, a performer could wear data gloves, use one or more joysticks, pushbuttons, or other elements to receive mechanical movement and generate electrical signals.

Any of these input devices or controllers can be modified to communicate wirelessly. Therefore, there are also wireless controls 240 that communicate via a wireless serial stream. For example, wireless finger controllers may be worn by the motion capture artists out in the motion capture volume. The wireless finger controllers are gloves that receive the fingers of the performer and the finger movements of the performer are transmitted via wireless serial stream back to the digital performance system.

Further, the controller 500 can have at least one marker 406 positioned thereon to provide a position to the motion capture system. In one embodiment, the controller 500 is hard-wired to a system that interprets the data inputted by a user, e.g., to control the face and/or hands. In another embodiment, the controller 500 is wireless so that the signals for the face and/or hands can be transmitted to the system wirelessly for interpretation.

Figure 6:
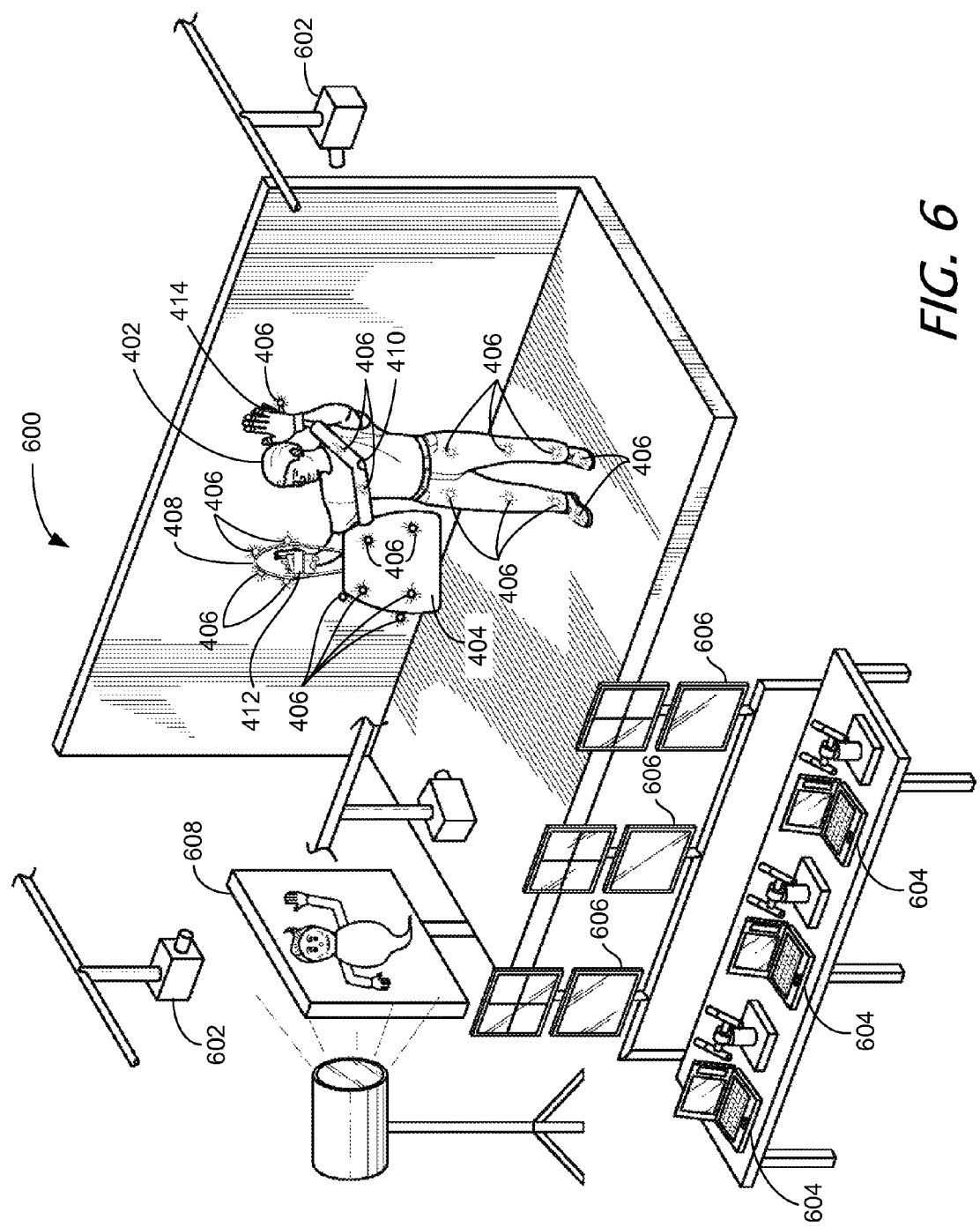
FIG. 6 illustrates a performance stage on which the single performer apparatus can be utilized to animate a computer generated character.

FIG. 6 illustrates a performance stage 600 on which the single performer apparatus can be utilized to animate a CG character. As the performer 402 moves around the stage with the single performer apparatus 404, the positions of the plurality of markers 406 located on both the performer and the puppet 404 are recorded by motion capture cameras 602. Further, the motion capture data and the puppetry data received from the head-hand controller 412 and the hand-hand controller 414 can be provided to one or more computers 604. The performer simultaneously provides the voice of the character through speaking through a wireless microphone.

Prior to receiving the motion capture data and the puppetry data, the computers 604 can render a CG character. Once the motion capture data and the puppetry data is received, the computers 604 can animate the CG character based on the motion capture data and the puppetry data. The animated CG character can then be displayed on one or more displays 606. The one or more displays 606 can be operably connected to the one or more computers 604. Further, the animated CG character 608 can be displayed on a display 608, which is also operably connected to the one or more computers 604. The puppeteer 402 can view the animation of the CG character on the display 608 to assist the puppeteer 402 with the performance. The resultant animated character can be rendered in almost or substantially real-time. The time taken to render, animate, and display the character is dependent on computing resources, such as CPU, memory, and network communications speed.

Figure 7:
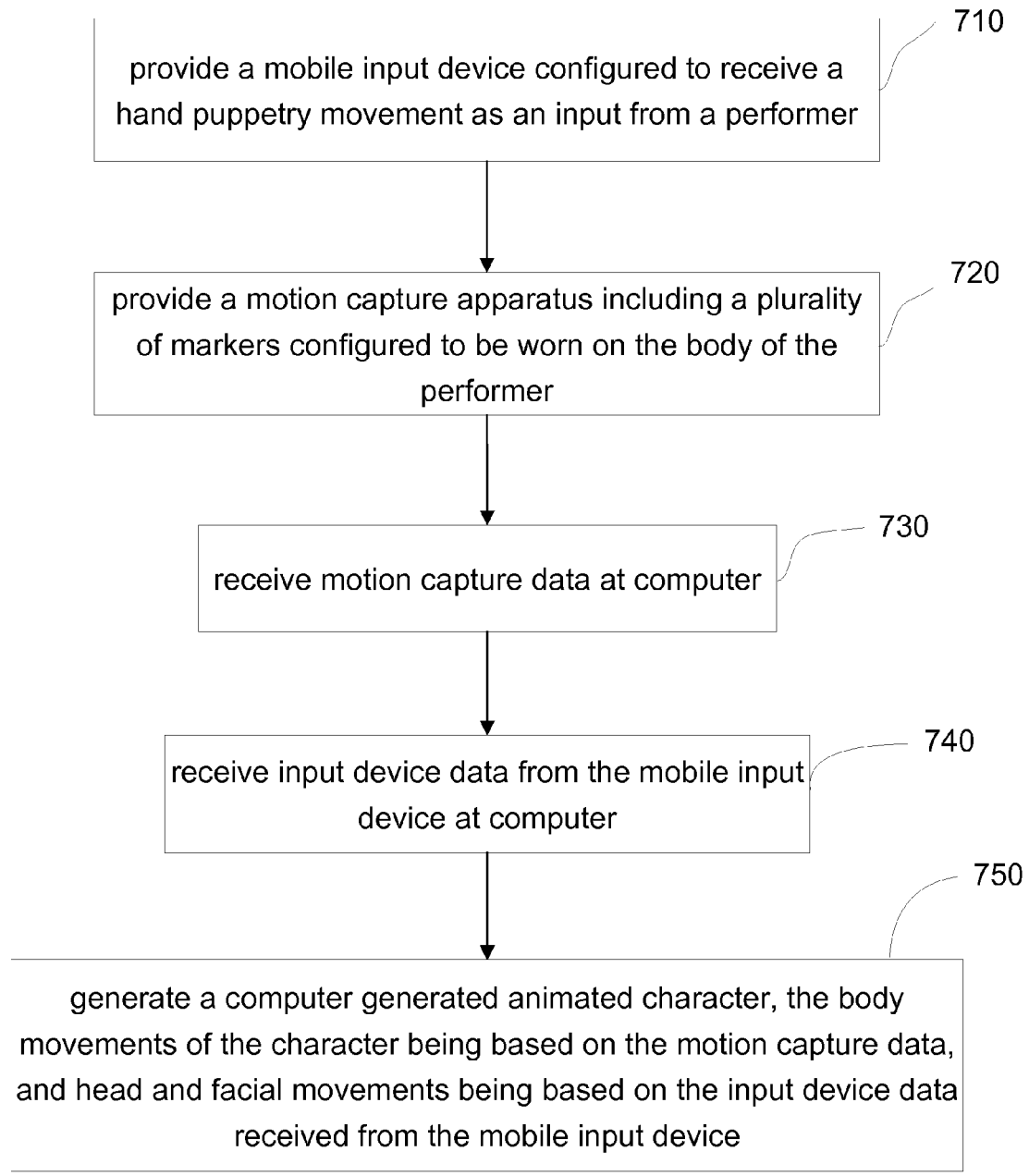
FIG. 7 is a block flow diagram illustrating a method of animating a computer generated character in real-time through a single person performance.

FIG. 7 is a block flow diagram illustrating one embodiment of a method for animating a computer generated character in real-time through a single person performance. As indicated at block 710, a mobile input device is provided to a performer. The mobile input device is configured to receive a hand puppetry movement from the performer. Furthermore, a motion capture apparatus is provided to the performer, as indicated at block 720. The motion capture apparatus comprises a plurality of markers configured to be worn on the body of the performer. At block 730, motion capture data representative of the positions of the plurality of markers is received by a computer. Furthermore, input device data representative of the hand puppetry movement made by the performer using the mobile input device is also received by the computer, as indicated at block 740. A computer generated character is then generated by the computer, as indicated at block 750. The animation of the computer generated character is based on the received motion capture data and input device data. The body movements of the character are based on the motion capture data. The facial and hand movements of the computer generated character are based on the input device data received from the mobile input device.

The single performer system and method disclosed herein allows for a single performer to animate an entire CG character. As a result, there is more spontaneity for animating the CG character. Furthermore, the traditional form of puppeteering can realistically be utilized in the digital realm. In other words, two brains cannot be as spontaneous as one brain for a CG character. Further, the single system and method allows production costs to be reduced because only one performer has to be paid as opposed to two or more performers.

As a result of the system and method described above, the time for producing an animated presentation can be significantly reduced. Further, the cost of producing an animated presentation can be reduced as only one performer, as opposed to multiple performers, is utilized for a CG character. In addition, there is more realistic animation of a CG character since one performer is in total control of the CG character, as opposed to a team of performers operating the CG character.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method for use with a single performer having a body, the method animating a computer generated character in real-time based on a performance provided by the single performer, the method comprising:
    providing a first mobile input device configured to be operated by the single performer during the performance, and when so operated, to receive a first hand puppetry movement as an input from the single performer, and transmit first input device data to a computer;
    providing a second mobile input device configured to be operated by the single performer during the performance, and when so operated, to receive a second hand puppetry movement as an input from the single performer, and transmit second input device data to a computer, the second mobile input device being operable independently from the first mobile device;
    providing a motion capture device that includes a plurality of markers, configured to be worn on the body of the single performer during the performance, the motion capture device being connected to the computer, and configured to transmit motion capture data to the computer, the motion capture data being independent of both the first input device data transmitted by the first mobile input device and the second input device data transmitted by the second mobile input device;
    receiving the motion capture data at the computer, the motion capture data being representative of the positions of the plurality of markers;
    receiving the first input device data from the first mobile input device at the computer, the first input device data representing the first hand puppetry movement of the single performer;
    receiving the second input device data from the second mobile input device at the computer, the second input device data representing the second hand puppetry movement of the single performer; and
    generating a computer generated animated character, the body movements of the character being based on the motion capture data received from the motion capture device for the single performer, head and facial movements being based on the first input device data received from the first mobile input device for the single performer, and hand movements being based on the second input device data received from the second mobile input device for the single performer.

2. The method of claim 1 wherein the motion capture device includes a motion capture stage and a plurality of cameras that recognize the plurality of markers.

3. The method of claim 1 for use with a single performer having a hand, wherein the first mobile input device includes a hand receptacle that receives the hand of the single performer.

4. The method of claim 1 wherein the single performer has a plurality of fingers, and the first mobile input device includes a plurality of finger receptacles that each receive one of the fingers of the single performer.

5. The method of claim 1 wherein the first mobile input device communicates using wireless controls.

6. The method of claim 1 wherein the first mobile input device includes a plurality of markers used for motion capture purposes.

7. The method of claim 1 further comprising applying the motion capture data and the first input device data to character data to animate the computer generated character.

8. The method of claim 1 further comprising displaying the animated computer generated character on a display in real-time with the performance.

9. The method of claim 1 wherein the motion capture device comprises a motion capture suit.

10. The method of claim 1 wherein the first mobile input device is configured to be held by the single performer and can move about with the single performer.

11. A device comprising:
    a head portion corresponding to a head of a computer generated character;
    a head-hand controller configured to be operated by a first hand of a single performer and when operated, to control facial movements of the computer generated character, the head-hand controller being located in the head portion of the device;
    an arm portion corresponding to an arm of the computer generated character;
    a hand-hand controller configured to be operated by a second hand of the single performer and when operated, to control hand movements of the computer generated character, the hand-hand controller being located in the arm portion of the device and operable separately from the head-hand controller;
    a body portion corresponding to a body portion of the computer generated character; and
    a plurality of markers positioned on the body portion of the device and configured such that a motion capture system detects movement of the markers, the detected movement controlling body movements of at least a portion of the body portion of the computer generated character, the motion capture system being configured to detect movement that is separate from the operation of the head-hand and hand-hand controllers.

12. The device of claim 11 further comprising a plurality of markers configured to be worn on a body of the single performer such that movement of at least a portion of the body of the single performer is detectable by the motion capture system, the detected movement providing movement data for at least a portion of the computer generated character.

13. The device of claim 11 wherein the device resembles a puppet.

14. The device of claim 11 wherein the head-hand controller and hand-hand controller communicate using wireless controls.

15. The device of claim 11 wherein the head-hand controller and hand-hand controller are configured to receive mechanical hand movements from the single performer, and to translate the mechanical hand movements into electrical signals.

16. A method of animating a computer generated character in real-time through a single person performance, the method comprising:
connecting a first mobile input device to a first hand of a single performer, the first mobile input device being configured to receive first hand puppetry movement data from the first hand of the single performer;
connecting a second mobile input device to a second hand of the same single performer, the second mobile input device being independently operable from the first mobile input device, and configured to receive second hand puppetry movement data from the second hand of the same single performer, the second hand puppetry movement data being distinct from the first hand puppetry movement data;
attaching a plurality of markers of a motion capture device to a body portion of the same single performer, the motion capture device being operable independently of the first mobile input device and the second mobile input device;
receiving motion capture data at a computer, the motion capture data being representative of positions of the plurality of markers;
receiving the first hand puppetry movement data from the first mobile input device at the computer;
receiving the second hand puppetry movement data from the second mobile input device at the computer; and
rendering a computer generated animated character in which body movement of the computer generated animated character is based on the motion capture data, head and a facial movement of the computer generated animated character is based on the first hand puppetry movement data, and hand movement of the computer generated animated character is based on the second hand puppetry movement data.

17. The method of claim 16 wherein the first and second mobile input devices communicates using wireless controls.

18. The method of claim 16 wherein the motion capture device includes a motion capture stage and a plurality of cameras configured to recognize the plurality of markers.

19. The method of claim 16 wherein the first mobile input device includes a hand receptacle that receives the first hand of the same single performer.

20. The method of claim 16, wherein the first hand of the same single performer has a plurality of fingers, and the first mobile input device includes a plurality of finger receptacles that each receive one of the fingers of the first hand of the same single performer.

21. The method of claim 1 for use with the single performer having a hand, wherein the first mobile input device is configured to be operated by the hand of the single performer, and when so operated, to transmit the first input device data to the computer, the first input device data and the motion capture data being receivable at the computer at the same time.

22. The device of claim 11, wherein both the head-hand controller and the hand-hand controller are operable at the same time that the markers positioned on the body portion of the device are movable, and the head-hand controller, the hand-hand controller, and the markers simultaneously control the facial movements, hand movements, and body movements of at least a portion of the body portion of the computer generated character, respectively.

23. A method for use with a single performer having a body with a plurality of motion capture markers positioned thereupon, a first hand, and a second hand, the method comprising:
at a motion capture system:
detecting movement of the motion capture markers positioned on the body of the single performer;
generating motion capture data based on the detected movement of the motion capture markers; and
transmitting the motion capture data to an animation system; and
at the animation system:
simultaneous with receiving the motion capture data from the motion capture system, receiving a first input signal and a second input signal, the first input signal being received from a first hand operated puppetry movement input device operated by the first hand of the single performer, and the second input signal being received from a second hand operated puppetry movement input device operated by the second hand of the single performer, the first hand operated puppetry movement input device being operable by the first hand separately from the operation of the second hand operated puppetry movement input device by the second hand;
animating body movements of a computer generated character based on the motion capture data;
animating head and facial movements of the same computer generated character based on the first input signal; and
animating hand movements of the same computer generated character based on the second input signal.

24. A method performed by a single performer having a body with a plurality of motion capture markers positioned thereupon, a first hand, and a second hand, the method comprising:
moving the body of the single performer relative to a motion capture device configured to detect movement of the motion capture markers positioned on the body of the single performer, the motion capture device generating motion capture data based on the detected movement of the motion capture markers; and
simultaneous with moving the body of the single performer, operating a first hand operated puppetry movement input device with the first hand of the single performer and operating a second hand operated puppetry movement input device with the second hand of the single performer, the first hand operated puppetry movement input device being different from the second hand operated puppetry movement input device, the motion capture device being different from the first and second hand operated puppetry movement input devices, operation of the first hand-operated puppetry movement input device transmitting a first input signal, operation of the second hand-operated puppetry movement input device transmitting a second input signal, body movements of a computer generated character being animated based on the motion capture data, at least one of head and facial movements of the same computer generated character being animated based on the first input signal, and hand movements of the same computer generated character being animated based on the second input signal.

* * * * *